US012743554B1

(12) United States Patent
Singh

(10) Patent No.: US 12,743,554 B1
(45) Date of Patent: Sep. 22, 2026

(54) TOKENIZATION AND DE-TOKENIZATION AS-A-SERVICE TO PROTECT SENSITIVE DATA

(71) Applicant: Capital One Services, LLC, McLean, VA (US)

(72) Inventor: Maninder Jeet Singh, Newark, DE (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 19/454,947

(22) Filed: Jan. 21, 2026

Related U.S. Application Data

(63) Continuation of application No. 19/385,236, filed on Nov. 11, 2025.

(51) Int. Cl.
*G06F 21/00* (2013.01)
*G06F 21/60* (2013.01)
*G06F 21/62* (2013.01)

(52) U.S. Cl.
CPC ........ *G06F 21/6254* (2013.01); *G06F 21/602* (2013.01)

(58) Field of Classification Search
None
See application file for complete search history.

(56) References Cited

U.S. PATENT DOCUMENTS

2018/0189502 A1* 7/2018 Kumar .................. H04L 9/0863

FOREIGN PATENT DOCUMENTS

EP 3716126 A1 * 9/2020 ......... G06F 21/6227
WO WO-2025250639 A1 * 12/2025 ............ G16H 10/60

* cited by examiner

*Primary Examiner* — Andrew J Steinle
(74) *Attorney, Agent, or Firm* — Banner & Witcoff, Ltd.

(57) ABSTRACT

The present disclosure describes techniques for simplifying the tokenization and/or de-tokenization of sensitive data in big data files. A tokenization service receives a dataset and instructions for handling sensitive data contained within the dataset via one or more interfaces. The tokenization service identifies a plurality of fields comprising sensitive data and generates a respective token for each field. The tokenization service replaces the sensitive data in each field with the respective token. The tokenization service stores the sensitive data from the dataset in a first secure memory location. After the dataset has been tokenized, the tokenized dataset may be sent to a destination, such as a cloud storage provider, a data silo, a third-party processor, etc. The destination may store the tokenized dataset in a second secure memory location.

20 Claims, 7 Drawing Sheets

100
Third-Party Computing Device 155
Gateway 150
Tokenization Service 110
First Storage System 115
Second Storage System 120
Third Storage System 125
File Share Service 145
Storage 130
API(s) 140
UI 137
135

FIG. 5

```
"Name":"John Doe",
"email":"jdoe@e-mailaddress.com",
"application": "spreadsheet",
"frequency": "onetime",
"team": "RedTeam",
"priority": "1",
"file_type": {
    "format":"delimited",
    "delimiter":",",
    "header-lines":2,
    "footer-lines":1,
},
"tokenization":{
    "3":{
    "type": "bank account number",
    "ID_column":"0"}
},
    "6":{
    "type":"bank account number",
    "ID":"185"}
},
"source location":{
    "account_type":"Secret",
    "indication of storage":{
        "bucket":{
            "east-location":"storage1-TaaS-USeast1",
            "west-location":"storage1-TaaS-USwest2"
        },
        "key":"URL1/filename"
    },
},
"target location":{
    "account_type":"Top Secret",
    "indication of storage":{
        "bucket":{
            "east-location":"storage2-TaaS-USeast1",
            "west-location":"storage2-TaaS-USwest2"
        },
        "key":"URL2/filename"
    },
},
```

505

510

520

530

540

Storage 130
Tokenized File 705
Identify Subset of Data 710
Secure Login to 3rd Party Site 720
De-Tokenize File 725
Send to 3rd Party 730
File 715
Tokenized File 705
UI 137
135

TOKENIZATION AND DE-TOKENIZATION AS-A-SERVICE TO PROTECT SENSITIVE DATA

CROSS REFERENCE TO RELATED APPLICATIONS

This application is a continuation of U.S. application Ser. No. 19/385,236, entitled "Tokenization and De-Tokenization As-A-Service to Protect Sensitive Data" and filed Nov. 11, 2025. The contents of the above listed application is expressly incorporated herein by reference in its entirety for any and all non-limiting purposes.

FIELD OF THE INVENTION

The present disclosure relates to securing data and, more particularly, tokenizing data for storage in cloud storage systems.

BACKGROUND OF THE INVENTION

Protecting large-scale big data files through tokenization and/or de-tokenization is a significant engineering challenge. In order to achieve protection, robust infrastructure and/or powerful tools are needed to secure sensitive data contained in the big data files. These complexities cause users to bypass steps needed to secure sensitive data. Accordingly, there is a need to simplify the process of securing sensitive data in big data files.

SUMMARY OF THE INVENTION

The following presents a simplified summary of various aspects described herein. This summary is not an extensive overview and is not intended to identify key or critical elements or to delineate the scope of the claims. The following summary merely presents some concepts in a simplified form as an introductory prelude to the more detailed description provided below.

Aspects described herein include techniques for simplifying the tokenization and/or de-tokenization of sensitive data in big data files. In particular, the present disclosure describes techniques that allow non-engineering users to store and/or transfer big data in a secure manner with the click of a button or via a system event. The tokenization service described herein protects data at scale and is compliant with laws, regulations, and/or corporate policies for securing sensitive data.

According to some aspects of the disclosure, the present disclosure describes a tokenization service receiving a dataset and instructions for handling sensitive data contained within the dataset. The dataset and instructions may be received via an interface, such as a user interface or one or more application programming interface(s) (API(s)). The dataset may comprise big data, which may comprise extremely large and complex datasets that exceed the capabilities of traditional data processing software. The instructions may be a configuration file or a policy associated with the dataset. The tokenization service may then identify a plurality of fields, in the dataset, comprising sensitive data. Identification of the sensitive data may be based on the instructions received with the dataset. In some instances, identification of the sensitive data may be based on a destination of the dataset. The tokenization service may generate a respective token for each field containing sensitive data and replace the sensitive data in each field with the respective token. The tokenization service may store the sensitive data from the dataset in a first secure memory location. In some instances, the first secure memory location may be associated with a source of the dataset. After the dataset has been tokenized, the tokenized dataset may be sent to a destination, such as a cloud storage provider, a data silo, a third-party processor, etc. The destination may store the tokenized dataset in a second secure memory location.

By providing an interface for the transfer and/or storage of datasets comprising sensitive data, the present disclosure improves the process of securing sensitive data in big data files by simplifying the process with which non-engineers can store and/or transfer big data. Indeed, reducing the complexity of securing sensitive data to the click of a button or a system event ensures that sensitive data is secured while being transferred and/or stored in third-party cloud storage systems.

These features, along with many others, are discussed in greater detail below.

BRIEF DESCRIPTION OF DRAWINGS

The present disclosure is illustrated by way of example and not limited to the accompanying figures in which like reference numerals indicate similar elements and in which:

FIG. 5 shows an example of instructions for tokenizing data in accordance with one or more aspects of the disclosure;

DETAILED DESCRIPTION OF THE INVENTION

Figure 1:
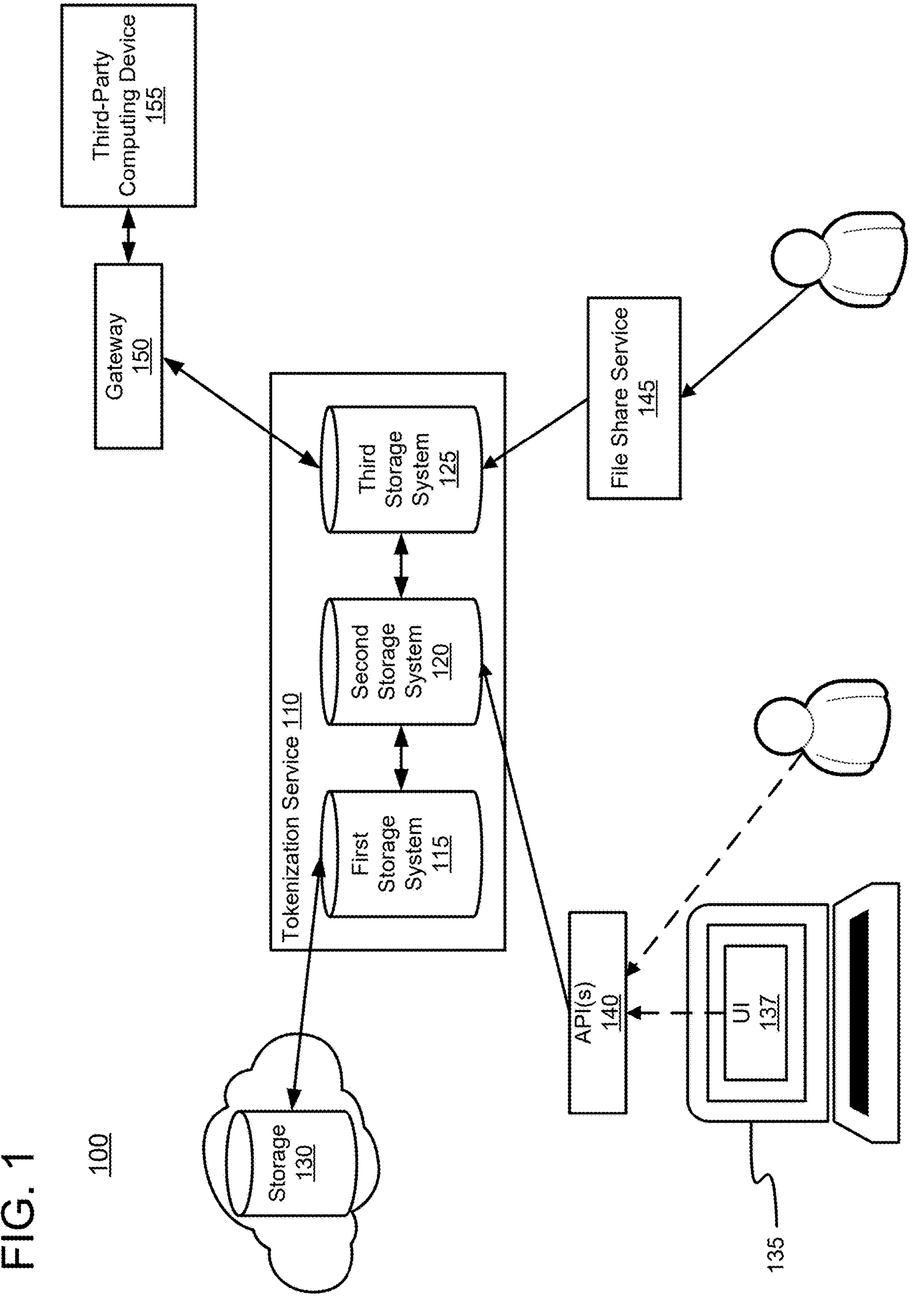
FIG. 1 depicts an example of a system for tokenizing and de-tokenizing data in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

As noted above, securing big data via tokenization and/or de-tokenization presents a significant engineering challenge, requiring robust infrastructure and/or powerful tools to secure sensitive data. These complexities result in users bypassing steps needed to secure sensitive data, and there is a need to simplify the process of securing sensitive data in big data files.

The present disclosure addresses the need to simplify the process of securing sensitive data in big data files by providing an interface that simplifies the process for securing sensitive data for transfer and/or storage. As will be described in greater detail below, the solution described herein reduces the complexity of securing sensitive data to the click of a button or a system event, thereby ensuring that sensitive data is secured while being transferred and/or stored in third-party cloud storage systems.

As will be provided in greater detail below, aspects of the present disclosure describe a tokenization service that receives, via an interface-such as a user interface or one or more application programming interface(s) (API(s)), a dataset and instructions for handling sensitive data contained within the dataset. The dataset may be big data. That is, the dataset may comprise extremely large and complex datasets that exceed the capabilities of traditional data processing software. The instructions may be a configuration file or a policy associated with the dataset. The tokenization service may then identify a plurality of fields, in the dataset, comprising sensitive data. Identification of the sensitive data may be based on the instructions received with the dataset. In some instances, identification of the sensitive data may be based on a destination of the dataset. The destination may be a third-party service and/or business partner. In some instances, the destination may comprise a third-party cloud storage system. In further examples, the destination may comprise a data silo within an entity (e.g., corporate entity). A data silo may comprise one or more storage locations and/or one or more data processors. The data silo may comprise collections of data associated with certain business units. Oftentimes, data silos are isolated from other parts of an organization, for example, due to different departments using separate systems and/or having their own goals. In the context of financial institutions, data silos may be used to secure customer information, payment information, etc. In this regard, different payment types may have different requirements for securing sensitive data and/or information. These requirements may be defined by state and/or federal laws and regulations. Additionally or alternatively, these requirements may be defined by corporate policy. The tokenization service described ensures that sensitive data in big data is secured when being shared, sent, transmitted, and/or transferred between different destinations.

The tokenization service may protect the sensitive data by generating a respective token for each field containing sensitive data. In some instances, generating the respective token for each field may comprise encrypting the sensitive data. In these examples, the respective token may be an encrypted representation of the sensitive data. Additionally or alternatively, the respective token for each field may comprise a hashed representation of the sensitive data. Once each of the tokens are generated, the tokenization service may store the sensitive data in a first secure memory location and replace the sensitive data in each field with the respective token. In some instances, the first secure memory location may be associated with a source of the dataset. After the dataset has been tokenized, the tokenized dataset may be sent to a destination, such as a cloud storage provider, a data silo, a third-party processor, etc. The destination may store the tokenized dataset in a second secure memory location.

The tokenization service may also de-tokenized big data. In this regard, a request may be received for the tokenized dataset. The tokenized dataset may be stored in a second memory location, associated with a data silo. The tokenization service may retrieve the tokenized dataset from the second memory location. The tokenization service may also retrieve the sensitive data from a first memory location. The tokenization service may replace the tokens in the dataset with the sensitive data retrieved from the first memory location. In some instances, replacing the tokens may comprise decrypting the tokens. Once the sensitive data has been re-introduced to (e.g., replaced in) the dataset, the dataset, with the sensitive data, may be sent to the requester.

By providing an interface for the transfer and/or storage of datasets comprising sensitive data, the present disclosure improves the process of securing sensitive data in big data files by simplifying the process with which non-engineers can store and/or transfer big data. Indeed, reducing the complexity of securing sensitive data to the click of a button or a system event ensures that sensitive data is secured while being transferred and/or stored in third-party cloud storage systems.

FIG. 1 shows an example of a system 100 for tokenizing and de-tokenizing data in accordance with one or more aspects of the disclosure. The system comprises a tokenization service 110, cloud storage 130, user device 135, file share service 145, and gateway 150.

Tokenization service 110 may be executed on one or more computing devices. The one or more computing devices may be a standalone server, a corporate server, or a server located in a server farm or cloud-computing environment. Additionally or alternatively, the one or more computing devices may be a virtual server hosted on hardware capable of supporting a plurality of virtual servers. Tokenization service 110 may be configured to execute as an on-premise solution. Additionally or alternatively, tokenization service 110 may be configured to execute as a hybrid solution, with part of the execution occurring on-premise and the other part of the execution occurring in a cloud computing environment. Tokenization service 110 may be configured to analyze data to identify sensitive data. In particular, tokenization service 110 may analyze "big data" to identify sensitive data. As used herein, "big data" shall mean extremely large and complex datasets that exceed the capabilities of traditional data processing software. Big data may be characterized by its volume (e.g., petabytes or zettabytes of data), velocity (e.g., the speed at which it is generated and processed, usually in real-time or near real-time), variety (e.g., different formats like structured, semi-structured, and/or unstructured data), veracity (e.g., accuracy and/or reliability), and/or value (e.g., the usefulness of the data).

After identifying sensitive data, tokenization service 110 may be configured to tokenize (e.g., encrypt, encapsulate, etc.) the sensitive data, for example, before sending the data to another user and/or storing the tokenized dataset in a cloud computing environment (e.g., could storage 130, discussed in greater detail below). Identifying the sensitive data may be based on one or more instructions received concurrently with the data and/or based on one or more policies. The sensitive data may be stored in an on-premise storage location. When the data requires additional processing, tokenization service 110 may be configured to de-tokenize the dataset. The tokenization and de-tokenization processes are described in greater detail below.

First storage system 115 may be any suitable storage system configured to store (e.g., save) data and/or information of a first type (e.g., payment card industry (PCI) data).

First storage system 115 may be associated with a first data silo for the storage and/or processing of data and/or information of the first type. The first type of data may be associated with one or more state and/or federal laws and/or regulations for securing sensitive data. As used herein, sensitive data may comprise personally identifiable information (PII) and/or any privileged information that is typically shared with only a few people, such as a social security number, a date of birth, a personal identification number, an account number, an account number associated with a transaction card, a bank account number, a tax identification number, a driver's license number, a passport number, mother's maiden name, financial or medical information, a passcode or password, a secret phrase, or an answer to a security question. Corporate policies, laws, and/or regulations may indicate what constitutes sensitive data. Additionally or alternatively, corporate policies, laws, and/or regulations may define safeguards to secure the sensitive data. First storage system 115 may be any suitable on-premise storage system. First storage system 115 may be a storage area network (SAN), a relational database, a hierarchical database, a distributed database, an in-memory database, a flat file database, a NoSQL database, a graph database, a data lake, a data silo, a lakehouse, a data warehouse, an object storage solution, and/or any combination thereof.

Second storage system 120 may be any suitable storage system configured to store (e.g., save) data and/or information of a second type. Second storage system 120 may be associated with a second data silo for the storage and/or processing of data and/or information of the second type. Like the first type of data above, the second type of data may be associated with one or more state and/or federal laws and/or regulations for securing sensitive data. Corporate policies, laws, and/or regulations may indicate what constitutes sensitive data. Additionally or alternatively, corporate policies, laws, and/or regulations may define safeguards for securing the sensitive data. Second storage system 120 may be any suitable on-premise storage system. Second storage system 120 may be a storage area network (SAN), a relational database, a hierarchical database, a distributed database, an in-memory database, a flat file database, a NoSQL database, a graph database, a data lake, a data silo, a lakehouse, a data warehouse, an object storage solution, and/or any combination thereof.

Third storage system 125 may be associated with a third data silo for the storage and/or processing of data and/or information of a third type. The third type of data may be associated with one or more state and/or federal laws and/or regulations for securing sensitive data. Third storage system 125 may be any suitable on-premise storage system. Third storage system 115 may be a storage area network (SAN), a relational database, a hierarchical database, a distributed database, an in-memory database, a flat file database, a NoSQL database, a graph database, a data lake, a data silo, a lakehouse, a data warehouse, an object storage solution, and/or any combination thereof.

While three storage systems are shown in FIG. 1, it will be appreciated that more, or fewer, data storage systems may be used depending on the types of data and/or information being processed and/or depending on the laws and regulations defining the handling of sensitive data.

Cloud storage 130 may be configured to store tokenized datasets on behalf of one or more entities (e.g., corporate entities). The tokenized datasets may include, but is not limited to, user account information, authentication credentials, access credentials, user entitlements, user privileges, user roles, user rights, policies (e.g., corporate governance policies), etc. Cloud storage 130 may be any suitable could-based storage solution, such as a storage area network (SAN), a relational database, a hierarchical database, a distributed database, an in-memory database, a flat file database, a NoSQL database, a graph database, a data lake, a data silo, a lakehouse, a data warehouse, an object storage solution, and/or any combination thereof.

User device 135 may be any suitable computing device. For example, user device 135 may be a mobile device, such as a cellular phone, a mobile phone, a smart phone, a tablet, a laptop, or an equivalent thereof. User device 135 may provide a first user with access to various applications and services. For example, user device 135 may provide the first user with access to the Internet and/or cloud computing resources, such as cloud storage 130. Additionally, user device 135 may provide the first user with one or more applications ("apps") located thereon. The one or more applications may provide the first user with a plurality of tools and access to a variety of services. In some embodiments, the one or more applications may include a user interface (UI) 137. User interface 137 may be configured to permit the first user to send, transmit, and/or transfer data to other users. Additionally or alternatively, user interface 137 may be configured to upload data to cloud computing resources, such as cloud storage 130. In this regard, user interface 137 may be an application executing on user device 135. Alternatively, user interface 137 may be a web interface accessed via a web browser executing on user device 135. User interface 137 may be configured to invoke tokenization service 110 to tokenize (or de-tokenize) data prior to the data being sent, transmitted, transferred, uploaded, and/or downloaded. Additionally or alternatively, user interface 137 may be configured to invoke one or more Application Programming Interface(s) (API(s)) 140, which may invoke tokenization service 110 to tokenize (or de-tokenize) data prior to the data being sent, transmitted, transferred, uploaded, and/or downloaded.

API(s) 140 may be configured to invoke tokenization service 110 to tokenize (or de-tokenize) data prior to the data being sent, transmitted, transferred, uploaded, and/or downloaded. In this regard, API(s) 140 may comprise a set of rules, protocols, and/or tools that allow different applications to communicate. API(s) 140 may comprise an interface for tokenization service 100.

File share service 145 may be any suitable service configured to allow users store, access, and/or share digital files over the internet. File share service 145 may allow for remote access, provide collaboration tools, and/or enhance security when compared to traditional methods, like email attachments. File share service 145 may provide an additional interface for accessing tokenization service 145. In this regard, a user may upload a document via file share service 145. File share service 145 may invoke tokenization service 110, which may review the file to identify sensitive data, tokenize the sensitive data, and transfer the file to a storage associated with an indicated destination.

Gateway 150 may be configured to invoke tokenization service 110 to tokenize (or de-tokenize) data prior to the data being sent, transmitted, transferred, and/or received from a third-party device, such as third-party computing device 155. Gateway 150 may allow for the secure transfer (e.g., sending, receiving) of data with the third-party device. In this regard, gateway 150 may be a data portal configured to provide a centralized and/or accessible location for data-sharing. Third-party computing device 155 may be one or more computing devices associated with a data processor. In some instances, the data processor may have a relationship with a corporate entity, such as a business partner, a clearinghouse, a transaction processor, etc.

Although not shown in FIG. 1, tokenization service 110, cloud storage 130, user device 135, file share service 145, and/or gateway 150 may be interconnected via one or more computer networks. The one or more computer networks may include any type of network, including, for example, the Internet, a local area network (LAN), a wide area network (WAN), a wireless telecommunications network, a corporate network, a distributed corporate network, and/or any other communication network or combination thereof. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, WiMAX and LTE, is presumed, and the various computing devices described herein may be configured to communicate using any of these network protocols or technologies. The data transferred to and from various computing devices in system 100 may include secure and sensitive data, such as confidential documents, customers' personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 100. Web services built to support a personalized display system may be cross-domain and/or cross-platform and may be built for enterprise use. Data may be transmitted using the Secure Sockets Layer (SSL) or Transport Layer Security (TLS) protocol to provide secure connections between the computing devices. Web services may be implemented using the WS-Security standard, providing secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in system 100 in front of one or more computing devices such that any external devices may communicate directly with the specialized hardware.

Figure 2:
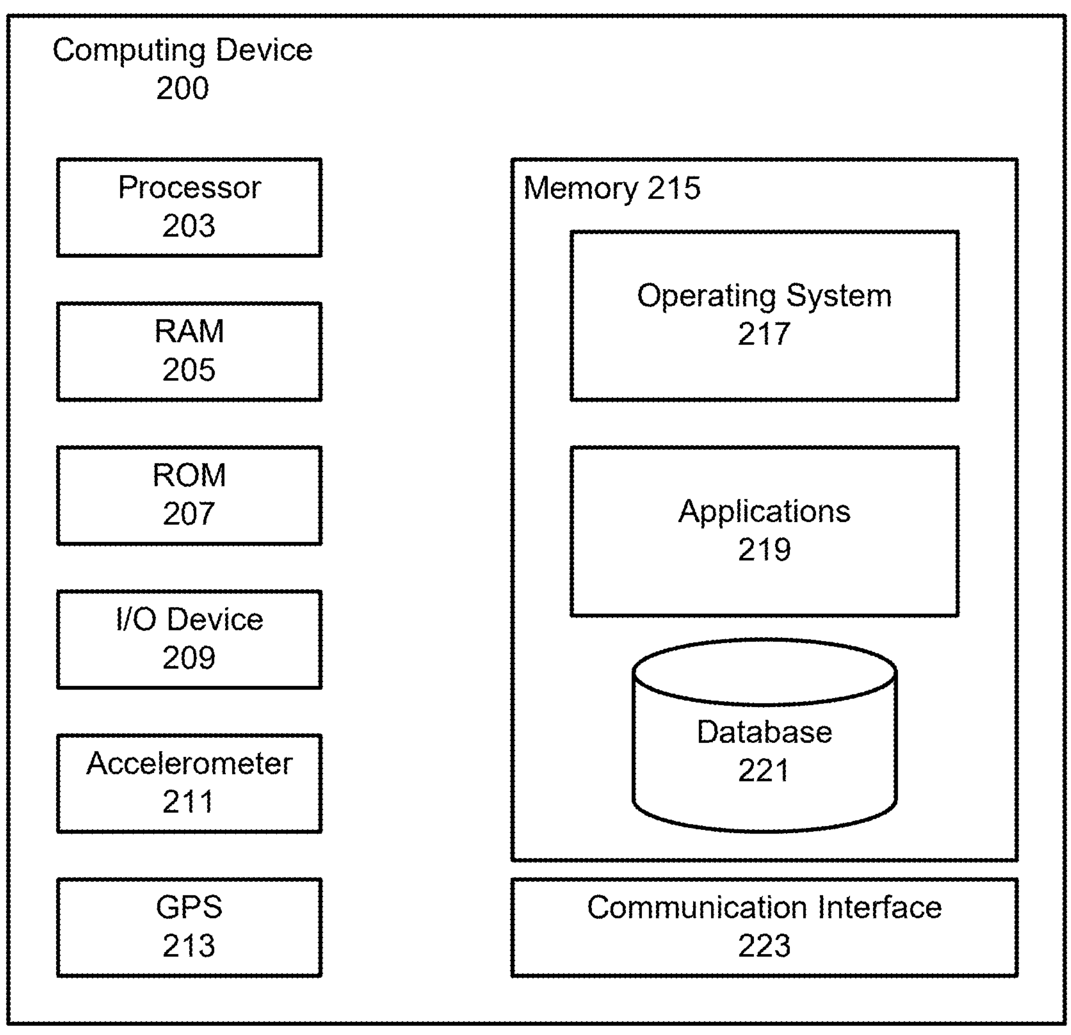
FIG. 2 shows an example computing device in accordance with one or more aspects of the disclosure.

Any of the devices and systems described herein may be implemented, in whole or in part, using one or more computing devices described with respect to FIG. 2. Turning now to FIG. 2, a computing device 200 that may be used with one or more of the computational systems is described. The computing device 200 may comprise a processor 203 for controlling overall operation of the computing device 200 and its associated components, including RAM 205, ROM 207, input/output device 209, accelerometer 211, global-position system antenna 213, memory 215, and/or communication interface 223. A bus 202 may interconnect processor(s) 203, RAM 205, ROM 207, memory 215, I/O device 209, accelerometer 211, global-position system receiver/antenna 213, memory 215, and/or communication interface 223. Computing device 200 may represent, be incorporated in, and/or comprise various devices such as a desktop computer, a computer server, a gateway, a mobile device, such as a laptop computer, a tablet computer, a smart phone, any other types of mobile computing devices, and the like, and/or any other type of data processing device.

Input/output (I/O) device 209 may comprise a microphone, keypad, touch screen, and/or stylus through which a user of the computing device 200 may provide input, and may also comprise one or more speakers for providing audio output and a video display device for providing textual, audiovisual, and/or graphical output. Software may be stored within memory 215 to provide instructions to processor 203 allowing computing device 200 to perform various actions. For example, memory 215 may store software used by the computing device 200, such as an operating system 217, application programs 219, and/or an associated internal database 221. The various hardware memory units in memory 215 may comprise volatile and nonvolatile, removable and non-removable media implemented in any method or technology for storage of information such as computer-readable instructions, data structures, program modules, or other data. Memory 215 may comprise one or more physical persistent memory devices and/or one or more non-persistent memory devices. Memory 215 may comprise random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Accelerometer 211 may be a sensor configured to measure accelerating forces of computing device 200. Accelerometer 211 may be an electromechanical device. Accelerometer may be used to measure the tilting motion and/or orientation computing device 200, movement of computing device 200, and/or vibrations of computing device 200. The acceleration forces may be transmitted to the processor to process the acceleration forces and determine the state of computing device 200.

GPS receiver/antenna 213 may be configured to receive one or more signals from one or more global positioning satellites to determine a geographic location of computing device 200. The geographic location provided by GPS receiver/antenna 213 may be used for navigation, tracking, and positioning applications. In this regard, the geographic location may also include places and routes frequented by the first user.

Communication interface 223 may comprise one or more transceivers, digital signal processors, and/or additional circuitry and software, protocol stack, and/or network stack for communicating via any network, wired or wireless, using any protocol as described herein.

Processor 203 may comprise a single central processing unit (CPU), which may be a single-core or multi-core processor, or may comprise multiple CPUs. Processor(s) 203 and associated components may allow the computing device 200 to execute a series of computer-readable instructions (e.g., instructions stored in RAM 205, ROM 207, memory 215, and/or other memory of computing device 215, and/or in other memory) to perform some or all of the processes described herein. Although not shown in FIG. 2, various elements within memory 215 or other components in computing device 200, may comprise one or more caches, for example, CPU caches used by the processor 203, page caches used by the operating system 217, disk caches of a hard drive, and/or database caches used to cache content from database 221. A CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For example, in a multi-tiered application, a database cache on an application server may reduce data retrieval and data manipulation time by not needing to communicate over a network with a back-end database server. These types of caches and others may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the disclosure.

Figure 3:
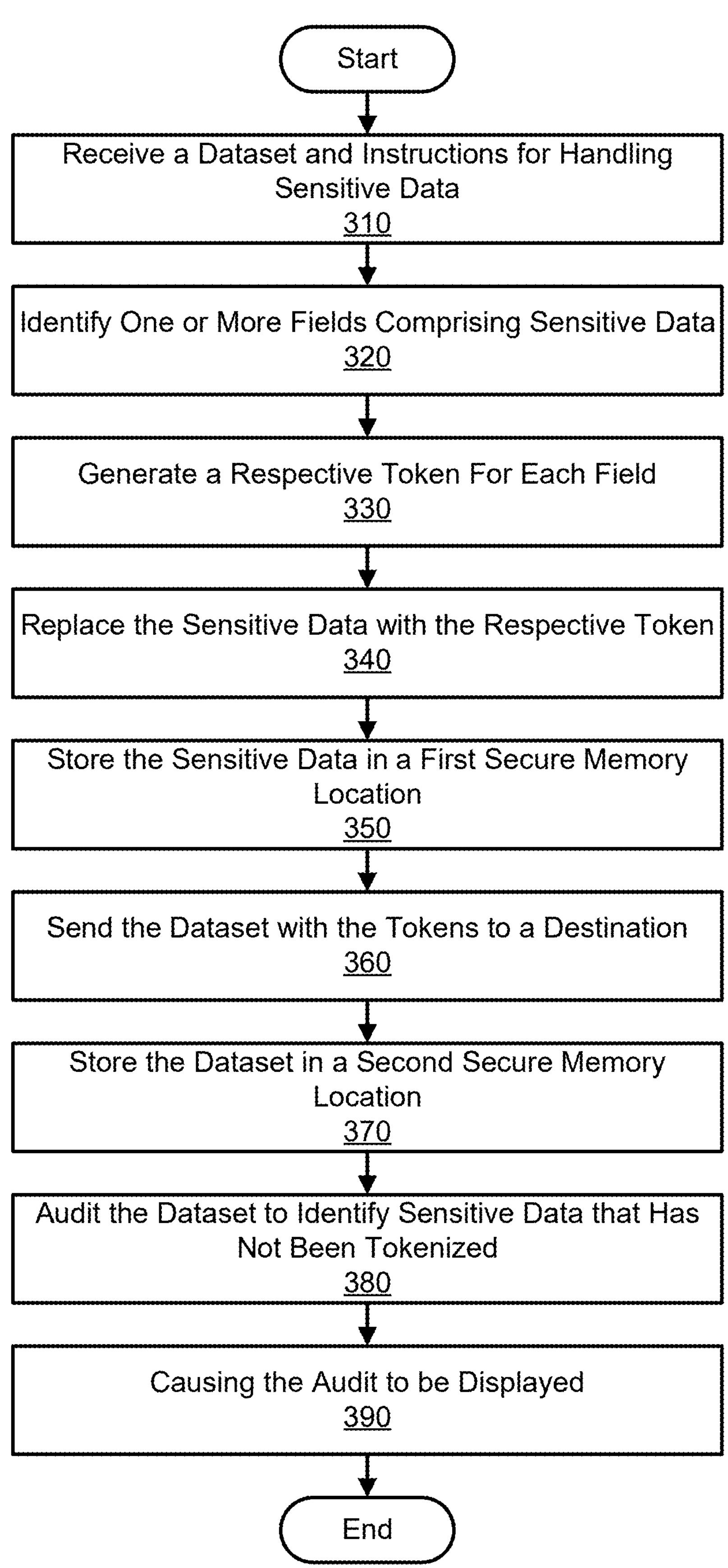
FIG. 3 shows an example of a flowchart for tokenizing data in accordance with one or more aspects of the disclosure.

FIG. 3 shows a flow chart of a process for tokenizing data according to one or more aspects of the disclosure. Some or all of the steps of process illustrated in FIG. 3 may be performed using one or more computing devices as described herein.

In step 310, a computing device may receive a dataset and instructions for handling sensitive data contained within the dataset. The dataset and/or instructions may be received via one or more interfaces. The one or more interfaces may comprise a graphical user interface (e.g., UI 137), one or more API(s) (e.g., API 140), a file share service (e.g., file share service 145), a gateway (e.g., gateway 150), or any equivalent thereof. As noted above, the dataset may comprise big data, which may comprise extremely large and complex datasets that exceed the capabilities of traditional data processing software. The dataset may comprise data of a certain type (e.g., PCI data, ACH data, etc.). The instructions may be a configuration file or a policy associated with the dataset.

In step 320, a tokenization service (e.g., tokenization service 110 executing on one or more computing devices) may identify one or more fields, in the dataset, comprising sensitive data. The one or more fields containing sensitive data may be identified based on instructions received with the dataset. As noted above, the instructions may be a configuration file. Additionally or alternatively, identification of the sensitive data may be based on one or more corporate policies, laws, and/or regulations. As noted above, the sensitive data may include one or more of: an account number associated with a transaction card; a bank account number; a tax identification number; a driver's license number; a passport number; a date of birth; or a social security number. a social security number, a date of birth, a personal identification number, an account number, an account number associated with a transaction card, a bank account number, a tax identification number, a driver's license number, a passport number, mother's maiden name, financial or medical information, a passcode or password, a secret phrase, or an answer to a security question. Additionally or alternatively, the identification of sensitive data may be based on one or more of a type of data in the dataset, a source of the dataset, a destination of the dataset, or any suitable equivalent thereof.

In step 330, the tokenization service may generate a respective token for each field containing sensitive data. In some instances, the tokenization service may generate the respective token for each field by encrypting the sensitive data. The tokenization service may encrypt the sensitive data using an encryption algorithm and an encryption key. The encryption algorithm may be advanced encryption standard (AES) encryption, Data Encryption Standard (DES), Triple DES (3DES), or any equivalent thereof. In some instances, the token may be generated using a hash function. In this regard, the sensitive data may be input into a one-way transformation function (e.g., hash function). The output of the one-way function may be used as the respective token for that field and/or sensitive data. Any suit one-way transformation function may be used, including, for example, MD5, SHA128, SHA256, SHA512, PBKDF2, BCrypt, SCrypt, etc.

In step 340, the tokenization service may replace the sensitive data in each field with the respective token. As noted above, the respective token may comprise an encrypted representation of the sensitive data. Additionally or alternatively, the respective token may comprise a hashed representation of the sensitive data. In further examples, each respective token may be an alphanumeric string generated by a pseudorandom number generator.

In step 350, the tokenization service may store the sensitive data in a first secure memory location. The first secure memory location may be associated with a source of the dataset. For example, the first secure memory location may comprise an on-premise storage location. In some instances, the tokenization service may store an encryption key and an identifier indicating a location of the sensitive data in the first secure memory.

In step 360, a computing device may send the tokenized dataset to a destination. As used herein, the tokenized dataset may include the dataset with tokens in place of the sensitive data. The destination may comprise a data silo within an entity, a third-party cloud storage system, a third-party computing device, and the like. Additionally or alternatively, the destination may be another user, either within the same business unit or in a different business unit than the source of the dataset.

In step 370, the tokenization service may store the dataset comprising tokens for fields in a second secure memory location. The second secure memory location may comprise a location associated with the destination. As noted above, the destination may be associated with a memory configured to received uploaded data corresponding to a type of data contained in the dataset. In further examples, the destination may comprise a third-party cloud storage system or a third-party computing device. In this regard, the tokenization techniques can be used when a user is sending, transmitting, transferring, and/or uploading to a data silo. Additionally or alternatively, the tokenization techniques can be used when a first user is sending, transmitting, transferring, and/or uploading to a second user. The tokenization techniques described herein can be used when transferring data between different data silos. The tokenization techniques may be used to secure data prior to the data being stored in a third-party storage system. Additionally, the tokenization techniques described herein when data may be received from a third-party computing device. It will be appreciated that the examples described above are merely illustrative and the tokenization techniques described herein may be used to secure data in a variety of other scenarios.

In step 380, a computing device may audit the tokenized dataset to identify sensitive data that has not been tokenized. The audit may be conducted on the tokenized dataset in the second secure memory location. The audit may review the tokenized dataset to identify one or more fields containing sensitive data that have not been tokenized. The audit may be based on laws, regulations, and/or corporate policies for securing sensitive data in the dataset. The audit may also be based on the type of data (e.g., PCI, ACH, etc.) contained in the dataset.

In step 390, the computing device may cause one or more results of the audit to be displayed. Displaying the one or more results of the audit may include displaying the one or more results on a user device or via a dashboard. Additionally or alternatively, the one or more results may be displayed in a report. The report may be part of a formal reporting requirement to one or more government agencies.

Figure 4:
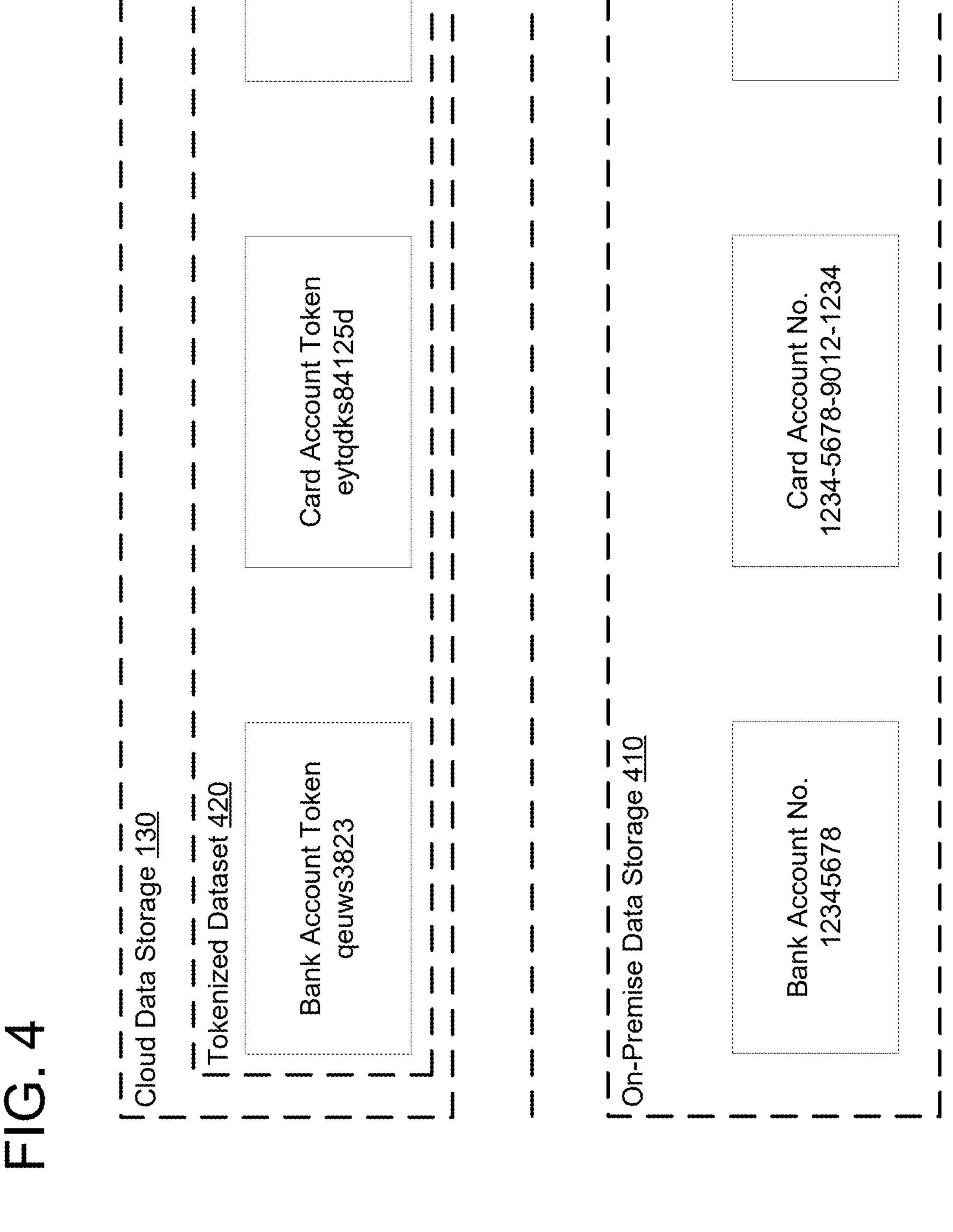
FIG. 4 shows an example of storing tokenized data in accordance with one or more aspects of the disclosure.

FIG. 4 shows the division of storing sensitive data in a secure, on-premise location, while a tokenized dataset is stored in a third-party cloud storage system. That is, FIG. 4 shows an example of storing tokenized data in accordance with one or more aspects of the disclosure. FIG. 4 includes cloud data storage 130 and on-premise data storage 410. Cloud data storage 130 was discussed in greater detail above. Cloud data storage 130 may be configured to store tokenized dataset 420. Tokenized dataset 420 may comprise a dataset with one or more fields that have been tokenized for containing sensitive data. As shown in FIG. 4, tokenized dataset 420 comprises tokenized data in fields for a bank account number, a card account number, and a tax identification number. Tokenized dataset 420 may comprise one or more fields that do not contain tokenized data. As noted above, the fields containing tokenized data may depend on the type of data, where the data is being stored, who has access to the data, etc. While FIG. 4 shows three tokenized fields, it will be appreciated that tokenized dataset 420 may comprise more, or fewer, fields with tokenized data.

On-premise data storage 410 may be any suitable storage solution, such as a storage area network (SAN), a relational database, a hierarchical database, a distributed database, an in-memory database, a flat file database, a NoSQL database, a graph database, a data lake, a data silo, a lakehouse, a data warehouse, an object storage solution, and/or any combination thereof. On-premise data storage 410 may be a secure memory location configured to store (e.g., save) sensitive data, encryption keys, etc.

FIG. 5 shows an example of instructions for tokenizing data in accordance with one or more aspects of the disclosure. As shown in FIG. 5, the instructions comprise a configuration file comprising header 505, file type 510, tokenization schema 520, source location information 530, and destination location information 540. However, it will be appreciated that the instructions may be in any suitable format, including, for example, one or more policies.

Header 505 may identify information associated with the dataset. The information contained in header 505 may include an owner (e.g., "Name": "John Doe"), an email address of the owner (e.g., "email": "jdoe@e-mailaddress.com"), an indication of the file type (e.g., "application": "spreadsheet"), a frequency with which the instructions apply (e.g., "frequency": "onetime"), a team associated with the dataset (e.g., "team": "RedTeam"), and/or a priority associated with the dataset (e.g., "priority": "1"). It will be appreciated that these fields are merely illustrative and the header may contain more, or fewer, fields than those illustrated in FIG. 5.

File type 510 may include information about the dataset. For example, file type 510 may include information about the format of the dataset (e.g., "format": "delimited"). While FIG. 5 shows a delimited file format, it will be appreciated that other file formats may be used, such as CSV, JSON, and the like. When the format of the dataset is delimited, file type 510 may include a field indicating the delimiter (e.g., "delimiter": ","). While a comma (",") is shown as the delimiter in FIG. 5, it will be appreciated that any appropriate delimiter (e.g., "|") may be used. File type 510 may also include information about the number of header lines that are contained in the dataset (e.g., "header-lines": 2) and/or the number of footer lines that are contained in the dataset (e.g., "footer-lines": 1).

Tokenization schema 520 may define sensitive data and/or the columns in which the sensitive data may be found. As shown in FIG. 5, tokenization schema 520 defines that the bank account number contained in column 3 and column 6 should be tokenized.

Source location information 530 may indicate a location from which the dataset originated. Source location information 530 may comprise a security-level (e.g., "account_type": "Secret") associated with the source location of the dataset. Source location information 530 may also include a location of where the dataset is stored (e.g., "east-location": "storage1-TaaS-USeast1", "west-location": "storage1-TaaS-USwest") and a filename (e.g., "key": "URL1/filename").

Similarly, destination location information 540 may indicate a location to which the dataset is being sent. Destination location information 540 may comprise a security-level (e.g., "account_type": "Top Secret") associated with the destination of the dataset. Destination location information 540 may also include a location of where the dataset is going to be stored (e.g., "east-location": "storage2-TaaS-USeast1", "west-location": "storage2-TaaS-USwest") and a filename (e.g., "key": "URL1/filename").

Figure 6:
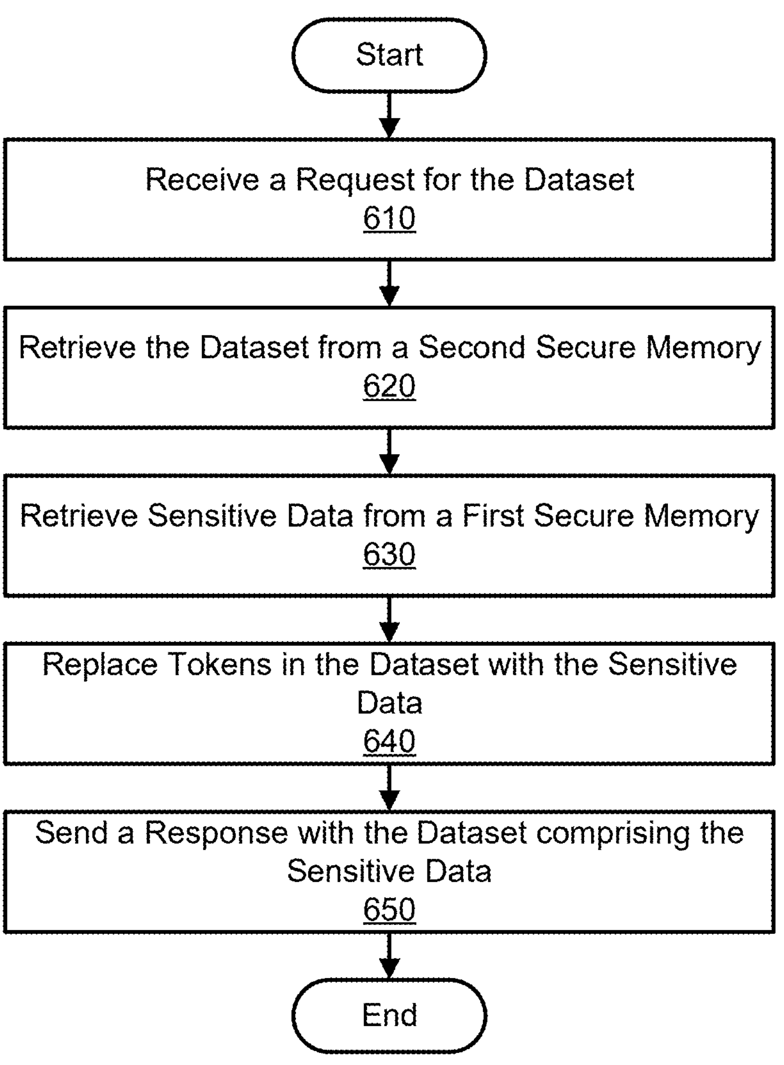
FIG. 6 shows an example of a flowchart for de-tokenizing data in accordance with one or more aspects of the disclosure.

Once the dataset is tokenized, the dataset will eventually have to be de-tokenized. FIG. 6 shows a flow chart of a process for de-tokenizing data according to one or more aspects of the disclosure. Some or all of the steps of process illustrated in FIG. 6 may be performed using one or more computing devices as described herein.

In step 610, a computing device may receive a request for a tokenized dataset. The request may comprise a request to send the dataset to another business unit (e.g., a different data silo). Additionally or alternatively, the request may comprise a request to send the dataset to a third party, for example, for additional processing. In step 620, a tokenization service (e.g., tokenization service 110 executing on a computing device) may retrieve a tokenized dataset from a second secure memory location. In step 630, the tokenization service may retrieve the sensitive data from a first secure memory location. In step 640, the tokenization service may replace each respective token with the respective sensitive data. As noted above, replacing each respective token with the respective sensitive data may comprise decrypting the respective data using the encryption key and a suitable decryption algorithm. In step 650, the computing device may send the de-tokenized dataset to a destination, such as a different data silo, a different storage location, and/or a third-party processor.

Figure 7:
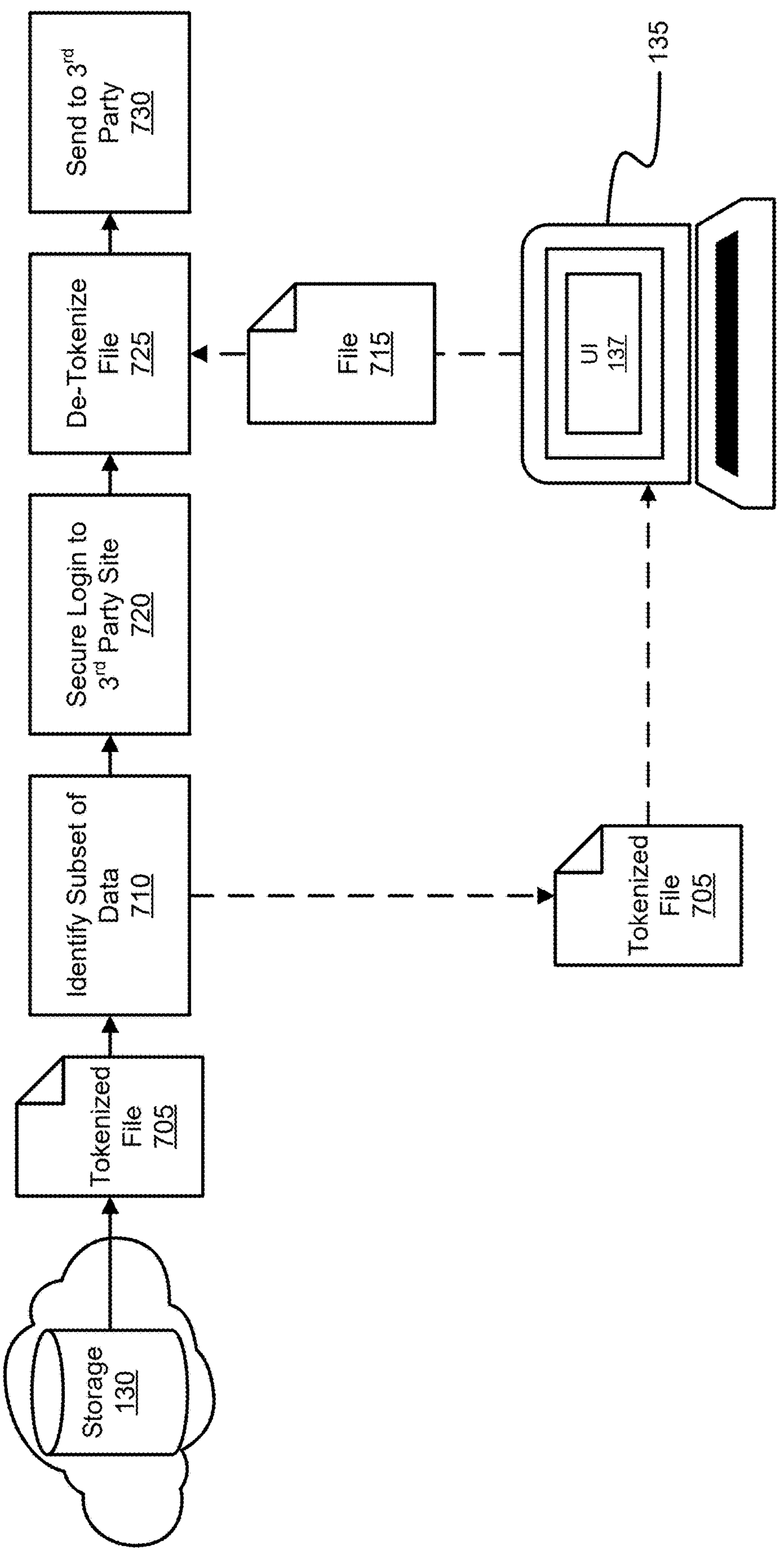
FIG. 7 shows an example of de-tokenizing data according to one or more aspects of the disclosure.

A corporate entity may send a list of compromised payment card numbers to a payment card services business card to investigate the issues with the list of compromised payment card numbers. FIG. 7 shows an example of de-tokenizing data according to one or more aspects of the disclosure. In particular, FIG. 7 shows an example of de-tokenizing data to share a dataset with a third-party computing device.

User device 135 may request, via UI 137, tokenized file 705 from cloud storage 130. In 710, a computing device may identify a subset of data contained in tokenized file 705. In the example described herein, the computing device may identify a list of compromised payment card numbers. After being analyzed, tokenized file 705 may be sent (e.g., transmitted) to user device 135. In 720, the computing device may log in to a third-party site (e.g., third-party computing device 155). In some instances, the computing device may log in to the third-party site via a gateway (e.g., gateway 150). Logging into the third-party site may be performed using a security token, such as an RSA token. In 725, the computing device may de-tokenize the file. In 730, the computing device may send the de-tokenized file to a third-party site (e.g., third-party computing device 155), which may process the received file.

The present disclosure addresses the need to simplify the process of securing sensitive data in big data files by providing an interface that simplifies the process for securing sensitive data for transfer and/or storage. The solution described above reduces the complexity of securing sensitive data to the click of a button or a system event, thereby ensuring that sensitive data is secured while being transferred and/or stored in third-party cloud storage systems. Indeed, reducing the complexity of securing sensitive data to the click of a button or a system event ensures that sensitive data is secured while being transferred and/or stored in third-party cloud storage systems.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method comprising:

storing, by a computing device, a plurality of different instructions for handling sensitive data, wherein each of the plurality of different instructions for handling sensitive data corresponds to a different user of a plurality of users;

receiving, from a first user of the plurality of users, a dataset;

identifying, based on first instructions, of the plurality of different instructions for handling sensitive data, corresponding to the first user, a plurality of fields, in the dataset, comprising sensitive data;

generating, for each of the plurality of fields, one or more tokens for obfuscating the sensitive data, wherein at least two tokens of the one or more tokens correspond to different sensitive data types;

generating a modified dataset by replacing each of the plurality of fields with a corresponding token of the one or more tokens;

storing, in a first database location associated with the first user, the sensitive data;

storing, in a second database location associated with the first user, the modified dataset;

receiving, from a first third party, a request for the dataset;

providing, to the first third party, based on avoiding disclosure of the sensitive data to the first third party, and responsive to the request, the modified dataset;

receiving, from a second third party, a second request for the dataset; and providing, to the second third party and responsive to the second request, the dataset comprising the sensitive data.

2. The computer-implemented method of claim 1, wherein the generating the one or more tokens for obfuscating the sensitive data comprises:

generating a first token by encrypting at least a portion of first content of a first field of the plurality of fields.

3. The computer-implemented method of claim 1, further comprising:

receiving, from the second third party, the second request for the dataset; and based on authenticating the second request:

de-tokenizing the modified dataset; and providing, to the second third party, the de-tokenized modified dataset.

4. The computer-implemented method of claim 3, wherein the de-tokenizing the modified dataset comprises replacing at least one of the one or more tokens with at least a portion of the sensitive data.

5. The computer-implemented method of claim 1, wherein the first database location corresponds to an on-premises server of the first user, and wherein the second database location corresponds to cloud storage.

6. The computer-implemented method of claim 1, further comprising:

processing the modified dataset stored in the second database location to identify one or more sensitive data fields that have not been tokenized; and causing output of an indication of the one or more sensitive data fields.

7. The computer-implemented method of claim 1, further comprising:

storing metadata associating the one or more tokens with the first user.

8. A computing device comprising:

one or more processors; and memory storing instructions that, when executed by the one or more processors, cause the computing device to:

store a plurality of different instructions for handling sensitive data, wherein each of the plurality of different instructions for handling sensitive data corresponds to a different user of a plurality of users;

receive, from a first user of the plurality of users, a dataset;

identify, based on first instructions, of the plurality of different instructions for handling sensitive data, corresponding to the first user, a plurality of fields, in the dataset, comprising sensitive data;

generate, for each of the plurality of fields, one or more tokens for obfuscating the sensitive data, wherein at least two tokens of the one or more tokens correspond to different sensitive data types;

generate a modified dataset by replacing each of the plurality of fields with a corresponding token of the one or more tokens;

store, in a first database location associated with the first user, the sensitive data;

store, in a second database location associated with the first user, the modified dataset;

receive, from a first third party, a request for the dataset;

provide, to the first third party, based on avoiding disclosure of the sensitive data to the first third party, and responsive to the request, the modified dataset;

receive, from a second third party, a second request for the dataset; and provide, to the second third party and responsive to the second request, the dataset comprising the sensitive data.

9. The computing device of claim 8, wherein the instructions, when executed by the one or more processors, further cause the computing device to generate the one or more tokens for obfuscating the sensitive data by causing the computing device to:

generate a first token by encrypting at least a portion of first content of a first field of the plurality of fields.

10. The computing device of claim 8, wherein the instructions, when executed by the one or more processors, further cause the computing device to:

receive, from the second third party, the second request for the dataset; and based on authenticating the second request:

de-tokenize the modified dataset; and provide, to the second third party, the de-tokenized modified dataset.

11. The computing device of claim 10, wherein the instructions, when executed by the one or more processors, further cause the computing device to de-tokenize the modified dataset by causing the computing device to replace at least one of the one or more tokens with at least a portion of the sensitive data.

12. The computing device of claim 8, wherein the first database location corresponds to an on-premises server of the first user, and wherein the second database location corresponds to cloud storage.

13. The computing device of claim 8, wherein the instructions, when executed by the one or more processors, further cause the computing device to:

process the modified dataset stored in the second database location to identify one or more sensitive data fields that have not been tokenized; and cause output of an indication of the one or more sensitive data fields.

14. The computing device of claim 8, wherein the instructions, when executed by the one or more processors, further cause the computing device to:

store metadata associating the one or more tokens with the first user.

15. One or more non-transitory computer-readable media storing instructions that, when executed by one or more processors of a computing device, cause the computing device to:

store a plurality of different instructions for handling sensitive data, wherein each of the plurality of different instructions for handling sensitive data corresponds to a different user of a plurality of users;

receive, from a first user of the plurality of users, a dataset;

identify, based on first instructions, of the plurality of different instructions for handling sensitive data, corresponding to the first user, a plurality of fields, in the dataset, comprising sensitive data;

generate, for each of the plurality of fields, one or more tokens for obfuscating the sensitive data, wherein at least two tokens of the one or more tokens correspond to different sensitive data types;

generate a modified dataset by replacing each of the plurality of fields with a corresponding token of the one or more tokens;

store, in a first database location associated with the first user, the sensitive data;

store, in a second database location associated with the first user, the modified dataset;

receive, from a first third party, a request for the dataset;

provide, to the first third party, based on avoiding disclosure of the sensitive data to the first third party, and responsive to the request, the modified dataset;

receive, from a second third party, a second request for the dataset; and provide, to the second third party and responsive to the second request, the dataset comprising the sensitive data.

16. The one or more non-transitory computer-readable media of claim 15, wherein the instructions, when executed by the one or more processors, further cause the computing device to generate the one or more tokens for obfuscating the sensitive data by causing the computing device to:

generate a first token by encrypting at least a portion of first content of a first field of the plurality of fields.

17. The one or more non-transitory computer-readable media of claim 15, wherein the instructions, when executed by the one or more processors, further cause the computing device to:

receive, from the second third party, the second request for the dataset; and based on authenticating the second request:

de-tokenize the modified dataset; and provide, to the second third party, the de-tokenized modified dataset.

18. The one or more non-transitory computer-readable media of claim 17, wherein the instructions, when executed by the one or more processors, further cause the computing device to de-tokenize the modified dataset by causing the computing device to replace at least one of the one or more tokens with at least a portion of the sensitive data.

19. The one or more non-transitory computer-readable media of claim 15, wherein the first database location corresponds to an on-premises server of the first user, and wherein the second database location corresponds to cloud storage.

20. The one or more non-transitory computer-readable media of claim 15, wherein the instructions, when executed by the one or more processors, further cause the computing device to:

process the modified dataset stored in the second database location to identify one or more sensitive data fields that have not been tokenized; and cause output of an indication of the one or more sensitive data fields.

* * * * *